United States Patent
Hernandez-Maldonado et al.

(10) Patent No.: US 10,369,544 B1
(45) Date of Patent: Aug. 6, 2019

(54) METHOD OF SYNTHESIZING NOVEL ADSORBENT TITANOSILICATE MATERIAL (UPRM-5) USING NR4+ TYPE CATIONS

(71) Applicants: Arturo J. Hernandez-Maldonado, Mayaguez, PR (US); Marietta E. Marcano-Gonzalez, Mayaguez, PR (US); Jose N. Primera-Pedrozo, Mayaguez, PR (US)

(72) Inventors: Arturo J. Hernandez-Maldonado, Mayaguez, PR (US); Marietta E. Marcano-Gonzalez, Mayaguez, PR (US); Jose N. Primera-Pedrozo, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 13/893,284

(22) Filed: May 13, 2013

Related U.S. Application Data

(63) Continuation-in-part of application No. 13/071,465, filed on Mar. 24, 2011, now Pat. No. 8,440,166.

(51) Int. Cl.
| | | |
|---|---|---|
| *C01B 39/00* | (2006.01) | |
| *C01B 39/02* | (2006.01) | |
| *B01J 20/30* | (2006.01) | |
| *B01J 20/10* | (2006.01) | |
| *C01B 39/04* | (2006.01) | |
| *C01B 39/08* | (2006.01) | |

(52) U.S. Cl.
CPC .......... *B01J 20/3057* (2013.01); *B01J 20/10* (2013.01); *B01J 20/3085* (2013.01); *C01B 39/02* (2013.01); *C01B 39/04* (2013.01); *C01B 39/085* (2013.01)

(58) Field of Classification Search
CPC .... B01J 20/10; B01J 20/3057; B01J 20/3085; C01B 37/005; C01B 39/085; C01B 39/00; C01B 39/02
USPC .................................................. 423/700–718
See application file for complete search history.

(56) References Cited

U.S. PATENT DOCUMENTS

| | | | | |
|---|---|---|---|---|
| 4,021,447 A | * | 5/1977 | Rubin et al. .................. | 548/402 |
| 5,011,591 A | * | 4/1991 | Kuznicki .............. | C01B 39/085 208/134 |
| 2004/0062909 A1 | * | 4/2004 | Tsapatsis ............. | B01D 53/228 428/131 |
| 2007/0243129 A1 | * | 10/2007 | Bell et al. ..................... | 423/716 |
| 2008/0249340 A1 | * | 10/2008 | Siler et al. .................... | 568/952 |

OTHER PUBLICATIONS

Kim et al. (Microporous and Mesoporous Materials, 56, 2002, pp. 89-100).*

* cited by examiner

*Primary Examiner* — Jun Li
(74) *Attorney, Agent, or Firm* — Hoglund & Pamias, PSC; Roberto J. Rios

(57) ABSTRACT

The invention employs tetrapropylammonium (TPA$^+$) and tetrabutylammonium (TBA$^+$) as structure directing agents (SDAs), respectively for the preparation of the flexible titanium silicate UPRM-5. Both UPRM-5 variants are detemplated and modified to include extraframework Sr$^{2+}$ and produce materials for carbon dioxide adsorption.

4 Claims, 13 Drawing Sheets

Isotherm models parameters for CO₂ adsorption on strontium exchanged UPRM-5 materials.

| Sorbent | Activation Temperature (°C) | Adsorption Temperature (°C) | Langmuir-Freundlich $q_e$ (mmol g⁻¹) | $n_{LF}$ (-) | $b$ (atm⁻¹) | Std. Dev.* | Dubinin-Astakhov $q_e$ (mmol g⁻¹) | $m$ (-) | $C$ (-) | Std. Dev.* |
|---|---|---|---|---|---|---|---|---|---|---|
| Sr²⁺-UPRM-5 (TPA) | 90 | 0 | 2.90 | 2.08 | 7.9 | ±0.012 | 2.62 | 2.24 | 0.142 | ±0.010 |
| | | 25 | | 1.94 | 1.70 | ±0.011 | | 2.05 | 0.166 | ±0.007 |
| | | 50 | | 1.95 | 0.47 | ±0.006 | | 1.71 | 0.200 | ±0.006 |
| | | 75 | | 1.68 | 0.29 | ±0.002 | | 1.73 | 0.227 | ±0.001 |
| Sr²⁺-UPRM-5 (TBA) | 120 | 0 | 2.50 | 1.92 | 10.75 | ±0.012 | 2.33 | 2.41 | 0.139 | ±0.008 |
| | | 25 | | 1.70 | 6.87 | ±0.009 | | 2.74 | 0.138 | ±0.012 |
| | | 50 | | 1.66 | 1.47 | ±0.005 | | 2.25 | 0.170 | ±0.007 |
| | | 75 | | 1.66 | 0.28 | ±0.002 | | 1.69 | 0.230 | ±0.001 |

ª The saturation loadings were estimated at 0 °C and assumed constant for the rest of the calculations.
* Standard deviation calculated based on residuals between the observed and calculated equilibrium loading amounts for the complete pressure range.

METHOD OF SYNTHESIZING NOVEL ADSORBENT TITANOSILICATE MATERIAL (UPRM-5) USING NR4+ TYPE CATIONS

GOVERNMENT INTEREST

The claimed invention was made with U.S. Government support under grant number HRD-0833112 awarded by the US National Science Foundation (NSF) and grant number NNX09AV05A awarded by the National Aeronautics and Space Administration (NASA). The government has certain rights in this invention.

BACKGROUND OF THE INVENTION

One of the main contributors to the accumulation greenhouse gases is the petroleum based energy sources, for which it has been predicted that for the next 50 years will add more than 400 gigatonnes of carbon dioxide into the atmosphere. A reasonable approach to solve this quandary may be the use of natural gas. However, significant amounts of hydrogen sulfide, nitrogen and carbon dioxide could make its efficiency as an energy source lower than that of petroleum based fuels. The removal of these species from natural gas effluents makes it also a less cost effective alternative, since the most common purification methods involve physical adsorption of $CO_2$ with a solvent and this requires a substantial energy input during the regeneration stage. Other alternatives include cryogenic methods, which could achieve acceptable removal efficiencies but are also energy intensive. The selective removal of $CO_2$ via adsorption processes at or near ambient conditions, on the other hand, could be an attractive solution from the energy consumption point of view, yet many of the available adsorbent materials still posses low working capacities. This problem, however, could be solved via implementation of bottom-up synthesis strategies in an attempt to produce adsorbents with framework properties that permit larger saturation capacities while sustaining the selectivity features. Furthermore, these characteristics could make the said materials suitable for closed-volume applications in which atmospheric control or revitalization is required, such as in spacecraft cabins in which breathable air require ultra-low carbon dioxide concentrations. The main challenge is to find inorganic compositions that will permit an increase in micropore surface area while allowing surface tailoring and modulation of the dimensions of the pore entrance.

Titanosilicates with mixed octahedral-tetrahedral units may provide the necessary requirements to produce adsorbents for the deep removal of $CO_2$. The combination of titanium centers with multiple coordination states allows the structure to be flexible upon dehydration while allowing for cation exchange (i.e., effective surface functionalization). In addition, the pore channel geometry and dimensions of these matrices can be controlled by employing a template or structure directing agent (SDA) during synthesis. Such is the case of a material known as UPRM-5, synthesized by Hernández and co-workers by using tetraethylammonium ($TEA^+$) cations as the SDA and which differs from other flexible titanosilicates (e.g., ETS-4). The use of a template during the synthesis of UPRM-5 resulted in a material with an enhanced thermal stability range and larger adsorption capacity, still without compromising the thermal pore contraction property. However, there is still much more to learn about how the type and nature of the SDA controls the coordination of the titanium centers and the level of structural faulting that gives origin to the thermal flexibility of the framework. Knowledge of this information would permit the design of more robust adsorbents to address the great challenge of reducing carbon dioxide emissions.

SUMMARY OF THE INVENTION

The present invention provides the synthesis and characterization of UPRM-5 materials prepared with larger $NR_4^+$ cations (i.e., tetrapropylammonium ($TPA^+$) and tetrabutylammonium ($TBA^+$)) acting as SDAs. The as-prepared UPRM-5 variants (i.e., $TPA^+$- and $TBA^+$-UPRM-5) and their detemplated and strontium exchanged versions have been characterized here via powder X-ray diffraction (XRD), diffuse reflectance infrared Fourier transform (DRIFT) spectroscopy, thermal gravimetric analysis (TGA), scanning electron microscopy (SEM), elemental analysis and porosimetry techniques, to explain the structural properties relevant to the material adsorption performance.

In addition, in situ high temperature X-ray diffraction (XRD) and $^{29}Si$ magic angle spinning nuclear magnetic resonance (MAS NMR) spectroscopy data has been studied to understand the framework contraction process. Adsorption isotherms for carbon dioxide, methane and nitrogen as well as carbon dioxide isosteric heat of adsorption on the $Sr^{2+}$ variants are also shown.

BRIEF DESCRIPTION OF THE DRAWINGS

Further features and advantages of the invention will become apparent from the following detailed description taken in conjunction with the accompanying figures showing illustrative embodiments of the invention, in which.

(TBA), adsorbents activated at 90 and 120° C., respectively, according to the present invention.

Figure 12:
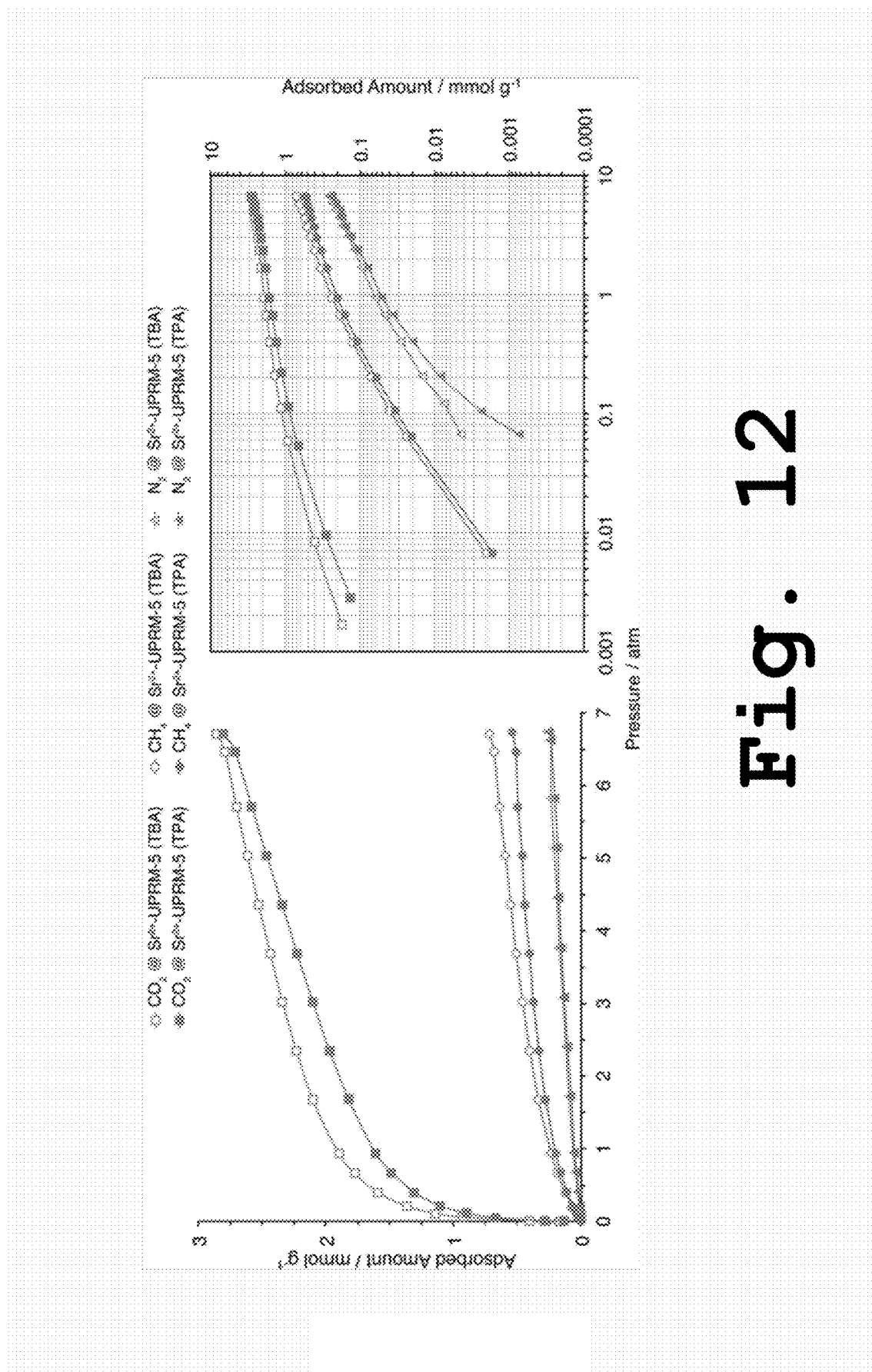

FIG. 12 shows pure component adsorption isotherms for carbon dioxide, methane and nitrogen on $Sr^{2+}$-UPRM-5 (TPA) and $Sr^{2+}$-UPRM-5 (TBA) at 25° C., adsorbents activated at 90 and 120° C., respectively, according to the present invention.

FIG. 13 shows a table indicating isotherm models parameters for $CO_2$ adsorption on strontium exchanged UPRM-5 materials, according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Experimental
UPRM-5 Microwave Assisted Synthesis, Detemplation and Functionalization.

Syntheses under autogenous conditions were carried using microwave-assisted system (MARS-5, CEM Corporation). Two gel mixtures with the following composition where prepared for each of the structure directing agents used in this invention: $3.4(TBA)_2O$: $7.3Na_2O$:1.2 $K_2O$: $1.3TiO_2$: $10SiO_2$: $201.5H_2O$; and $3.4(TPA)_2O$: $7.3Na_2O$:1.2 $K_2O$: $1.3TiO_2$: $10SiO_2$: $201.5H_2O$. A portion of the mixtures was placed into 100 ml Teflon vessels (XP-1500 Plus, CEM Corporation). A control vessel also containing one of the said mixtures was used to avoid damaging of the MARS-5 optical fiber temperature probe and sapphire thermowell. This was accomplished by adjusting the pH to 7 with a 6 M HCl aqueous solution. The samples were heated to 215° C. using a temperature ramp of 20° C. $min^{-1}$. The reaction or aging time varied from 4 to 24 h at a power level that did not exceeded 400 W. The resulting solid materials (i.e., $TPA^+$- and $TBA^+$-UPRM-5) were recovered via vacuum filtration, washed with 2 L of distilled/deionized water and stored in a forced convection oven at 60° C. for 18 h. For carbon dioxide adsorption measurements, the samples were first detemplated via ion exchange with $NH_4^+$ and followed by exchange with $Sr^{2+}$ cations, using $NH_4Cl$ and $SrCl_2$ aqueous solutions, respectively. The ion-exchange procedures are described elsewhere. For clarity, the strontium-exchanged samples will be labeled $Sr^{2+}$-UPRM-5 (TPA) and $Sr^{2+}$-UPRM-5 (TBA) depending on whether tetrapropylammonium or tetrabutylammonium cations were employed as SDAs, respectively.

Materials Characterization.

Standard XRD patterns of as-synthesized $TPA^+$- and $TBA^+$-UPRM-5 were obtained using a Rigaku Ultima III X-ray diffraction unit fitted with cross beam optics, a Cu-kα target and calibrated for focusing-type optics. A voltage and current of 40 kV and 44 mA was used for operation. Patterns were collected for 2θ diffraction angles from 5° to 40° at a scanning rate and step size of 1° $min^{-1}$ and 0.02°, respectively. SEM analysis of the samples was performed using a JEOL-JSM-6930LV scanning electron microscope operating at a voltage range of 5.0-20.0 kV. The images were obtained following standard procedures for low conductive samples. The SEM micrographs were employed to identify the morphology and estimate the average crystal size of UPRM-5 samples. Elemental analysis of the $Sr^{2+}$ ion exchange materials for silicon, titanium and strontium content was completed using inductively coupled plasma mass spectrometry (ICP-MS). These tests were performed at Galbraith Laboratories, Inc. in Knoxville, Tenn.

A high-resolution TA-Q500 system was used to perform TGA measurements under a constant helium flow of 60 mL/min and heating from room temperature to 600° C. at a rate of 5° C./min. DRIFT spectra were acquired for all samples in the 600-4000 $cm^{-1}$ range with a resolution in absorbance of 4 $cm^{-1}$ using a Nicolet 6700 Optical Spectrometer unit fitted with a Praying Mantis Diffuse Reflectance module (Harrick Scientific Products, Inc.). A DLa TGS detector was employed during the DRIFT measurements.

In situ high-temperature XRD patterns of $Sr^{2+}$-UPRM-5 (TPA) and -UPRM-5 (TBA) variants were gathered using a high temperature ReactorX module (Rigaku Corporation) attached to the aforementioned Rigaku Ultima III system. The module allows enclosure of the sample under a control environment while allowing the passage of X-rays by means of a continuous beryllium window. Precise in situ heating was accomplished by means of an infrared-based source. The sample is loaded into the ReactorX module by means of a black quartz plate that allows the attachment of a 1/16" diameter thermocouple for accurate temperature measurement. X-ray scans were gathered at 3.5° $min^{-1}$ while the sample was heated from room temperature to 600° C. at 1° C. $min^{-1}$ in flowing helium (Ultrahigh Purity Grade, Praxair) at 60 mL $min^{-1}$.

High-resolution solid-state $^{29}Si$ magic angle spinning (MAS) nuclear magnetic resonance (NMR) experiments for as synthesized TPA-UPRM-5 and TBA-UPRM-5 were performed on a ultra-narrow bore 19.6 T magnet using a Bruker DRX NMR console with the $^{29}Si$ Larmor frequency of 165.55 MHz and using an in-house built 4 mm single resonance MAS NMR probe. A single 2 μs pulse (~15 degree flip angle) was used to directly excite the $^{29}Si$ magnetization. The sample was spun at 8 kHz and 4096 transients were used to accumulate the signal with a recycle delay of 10 s. The $^{29}Si$ chemical shifts were referenced to 4,4-dimethyl-4-silapentanesulfonate sodium (DSS). No line broadening was used in the spectrum.

Textural Properties, Adsorption Measurements, and Isosteric Heat of Adsorption.

Surface area measurements were done for $Sr^{2+}$-UPRM-5 (TPA) and $Sr^{2+}$-UPRM-5 (TBA) variants using a Micromeritics ASAP 2050 static volumetric adsorption system. Nitrogen volumetric equilibrium adsorption at −196° C. was used to determine the adsorbent variants textural properties. Prior to each analysis, these samples were activated/degassed in vacuum at 90, 120, 150, 180, 240 or 300° C. for 18 hours. In addition, the resulting nitrogen adsorption isotherms were transformed using the t-plot method (Lippens and de Boer) to determine the micropore surface area.

Pure component carbon dioxide adsorption analyses were also performed on the strontium ion-exchanged UPRM-5 variants, at 25° C. and pressures up to 7 atm. The analyses were performed using the volumetric adsorption apparatus previously mentioned and carbon dioxide gas (Ultrahigh Purity grade, Praxair). Adsorbent activation (as described above) was also performed prior these analyses. In addition, the $CO_2$ equilibrium adsorption data with the Langmuir-Freundlich (L-F) and Dubinin-Astakhov (D-A) models, respectively. The L-F equation is given by:

$$\frac{q}{q_o} = \frac{(bP)^{1/n_{LF}}}{1+(bP)^{1/n_{LF}}} \qquad (1)$$

while the D-A equation is given by:

$$\frac{q}{q_o} = \exp\left[-\left(C\ln\frac{P_s}{P}\right)^{n_{DA}}\right] \quad (2)$$

where C is defined by:

$$C = \frac{RT}{\beta E}$$

and q is the adsorbed amount, $q_o$ is the saturated adsorbed amount, b is an interaction parameter, P is partial pressure, $P_s$ is the saturated vapor pressure of the adsorbate, R is the universal ideal gas constant, T is temperature, $\beta$ is the affinity coefficient, E is the characteristic adsorption energy, and $n_{LF}$ and $n_{DA}$ are constants related to the surface heterogeneity. Saturated adsorbed amounts for carbon dioxide were estimated from the isotherms data gathered at 0° C. and assumed constant during fitting of isotherm data gathered at other temperatures. This is a reasonable approach since sorbate-sorbate interactions become negligible at lower temperatures and loading saturation amounts could be achieved at a much lower pressure range. In addition, saturated vapor pressure data above the critical point were estimated using the reduced Kirchoff equation.

Isosteric heats of adsorption of carbon dioxide onto the $Sr^{2+}$ ion exchanged UPRM-5 variants were determined using the classic Clausius-Clapeyron equation at constant surface loading:

$$\frac{d\ln P}{d(1/T)}\bigg|_{q=cont.} = -\frac{\Delta H_{ads}}{R} \quad (3)$$

In this equation R is the gas constant, P is the equilibrium pressure at a particular coverage q and T is the absolute temperature.

Results and Discussion

Materials Synthesis and Characterization.

Microwave irradiation has been proven to be a useful method to reduce synthesis completion time due to a more efficient heating of reaction mixtures. Different from conventional convective heating, microwaves reduce the presence of second phases by increasing the synthesis crystallization rates. Hernandez-Maldonado and co-workers have shown that neat crystals of UPRM-5 prepared with $TEA^+$ as SDA can be obtained at 16 hours through microwave irradiation, compared with 12 days using conventional hydrothermal conditions. To optimize the synthesis reaction time for $TPA^+$- and $TBA^+$-UPRM-5, microwave-assisted synthesis were performed for time or aging periods between 4 and 24 hrs.

Figure 1:
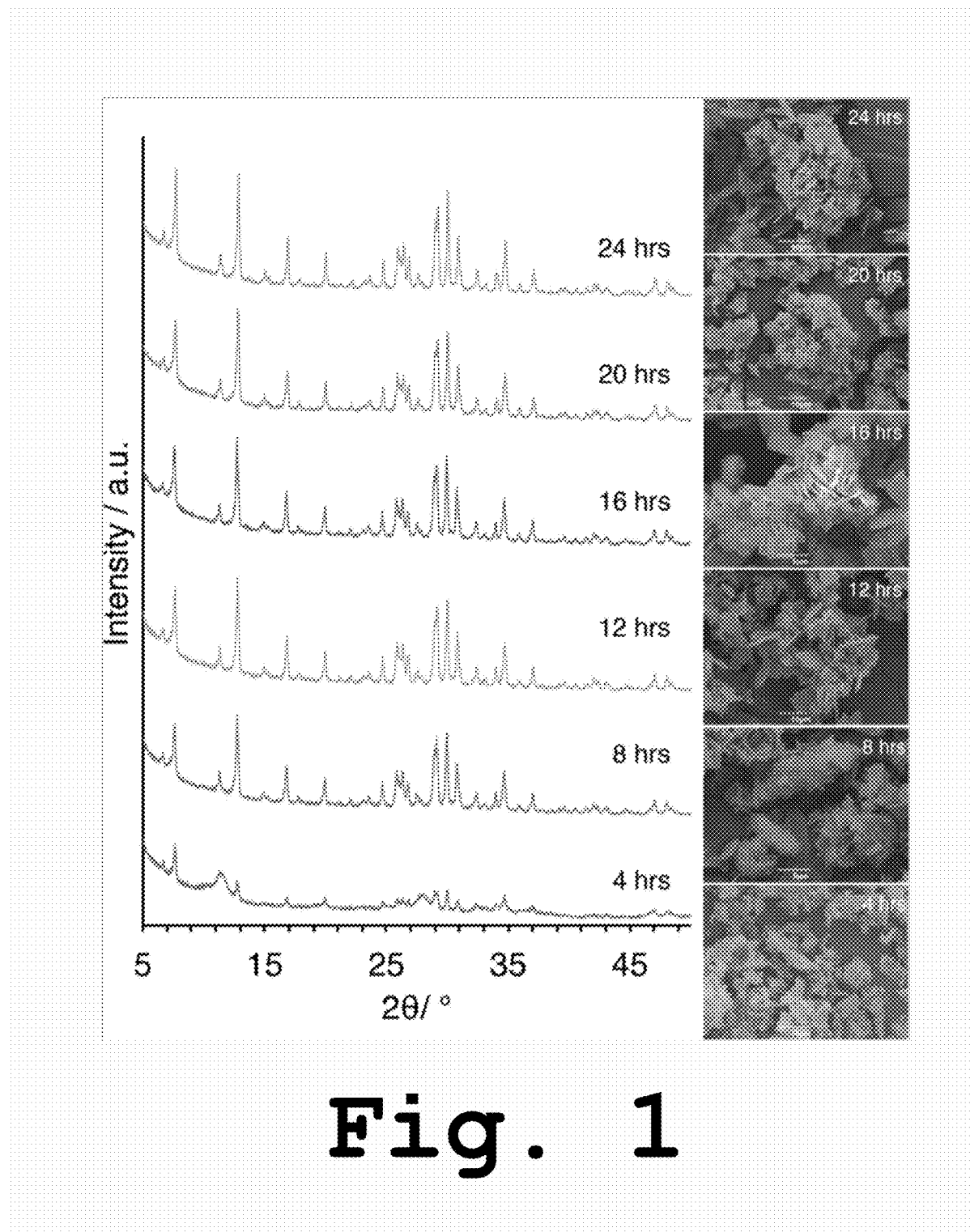
FIG. 1 shows XRD patterns and SEM images of as-synthesized $TPA^+$-UPRM-5 materials prepared at different aging times and via microwave assisted heating, according to the present invention.
Figure 2:
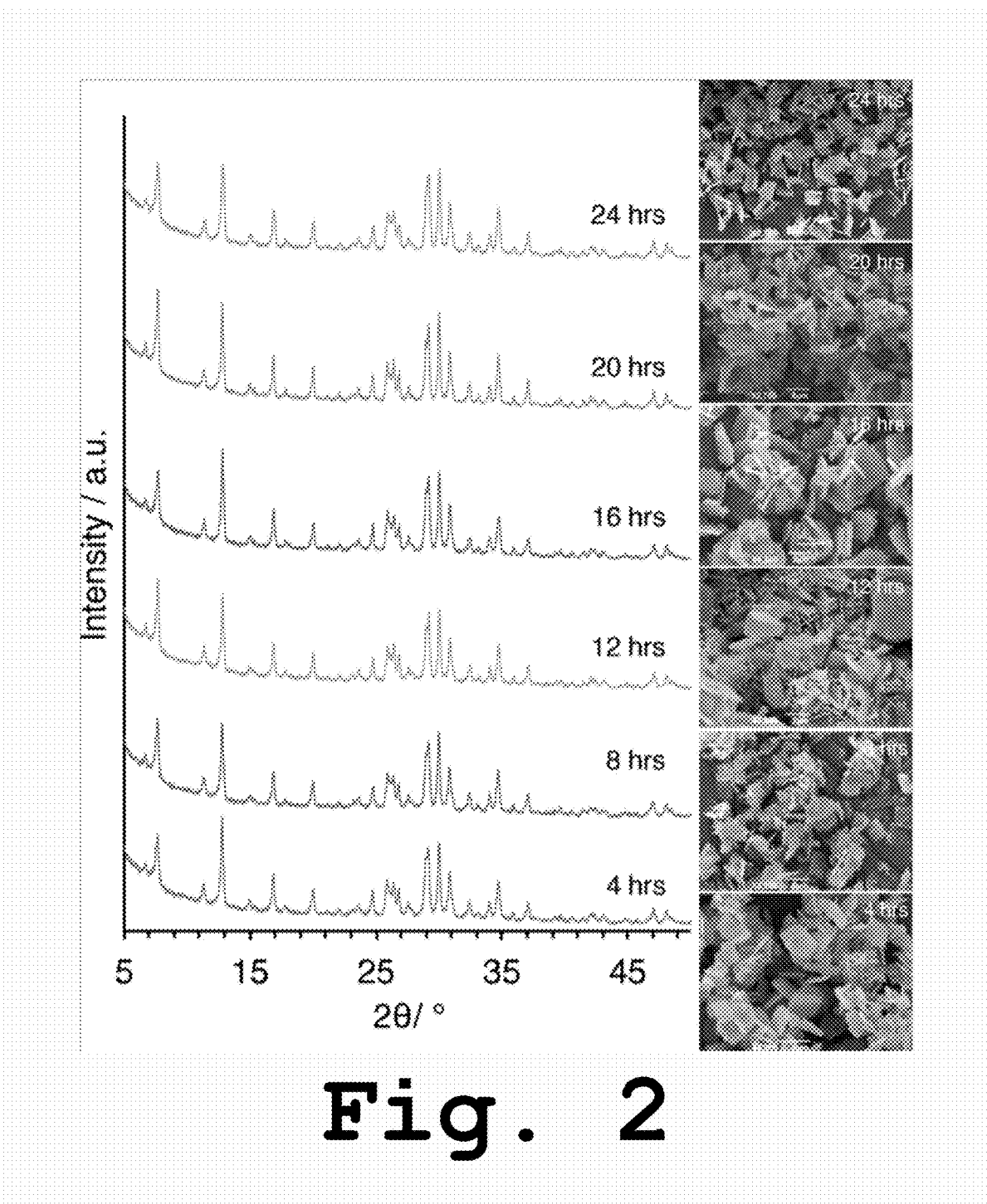
FIG. 2 shows XRD patterns and SEM images of as-synthesized $TBA^+$-UPRM-5 materials prepared at different aging times and via microwave assisted heating, according to the present invention.

XRD patterns for as-synthesized $TPA^+$- and $TBA^+$-UPRM-5 as a function of synthesis time are gathered in FIGS. 1 and 2, respectively. According to the overall intensity peak profile, the sample with higher crystallinity corresponded to $TPA^+$-UPRM-5 synthesized at 24 hours. However, the SEM micrographs showed that a pure UPRM-5 phase could be obtained after just 12 hours. Using the same criteria, for $TBA^+$-UPRM-5 the highest crystallinity was obtained for a reaction time of 20 hours. Rectangular $TPA^+$-UPRM-5 crystals are clearly seen after at least 12 hours of reaction time. Shorter reactions times resulted in the presence of a secondary phase that appears to be mostly amorphous (see SEM micrographs in FIG. 1). A similar behavior trend was observed during the synthesis of $TBA^+$-UPRM-5 (FIG. 2). It is important to point out that even when both materials exhibited similar crystals or particle morphology, the ones corresponding to $TPA^+$-UPRM-5 are larger in size when compared to those $TBA^+$-UPRM-5. In fact, the average thickness of the crystals plates for $TPA^+$-UPRM-5 is nearly an order of magnitude larger than that of the other variant. Although this difference is plausibly attributed to the use of different SDAs, it could also be attributed to the different reaction times employed during the microwave assisted heating synthesis.

For titanosilicates ETS-10 and ETS-4, the X-ray diffraction peaks observed in the $2\theta=5\text{-}15°$ region have been related to the octahedral and semi-octahedral titanium chains encompassing the pore channels. Assuming that both of the UPRM-5 variants of the invention can be obtained by superposition of polymorphs that are also representative of the ETS-4 materials, the aforementioned XRD analysis could be employed for the data shown in FIGS. 1 and 2. The patterns exhibit relative intensities with maxima at $2\theta=7.6°$ for the samples prepared with $TPA^+$ and $2\theta=12.6°$ for the ones prepared with $TBA^+$. Therefore, the differences in relative intensities in the $2\theta=5\text{-}15°$ region may suggest different levels of faulting or amount of semi-octahedral titanium centers located near the pore rings. In order to verify this the samples were subjected to $^{29}Si$ MAS NMR tests.

Figure 3:
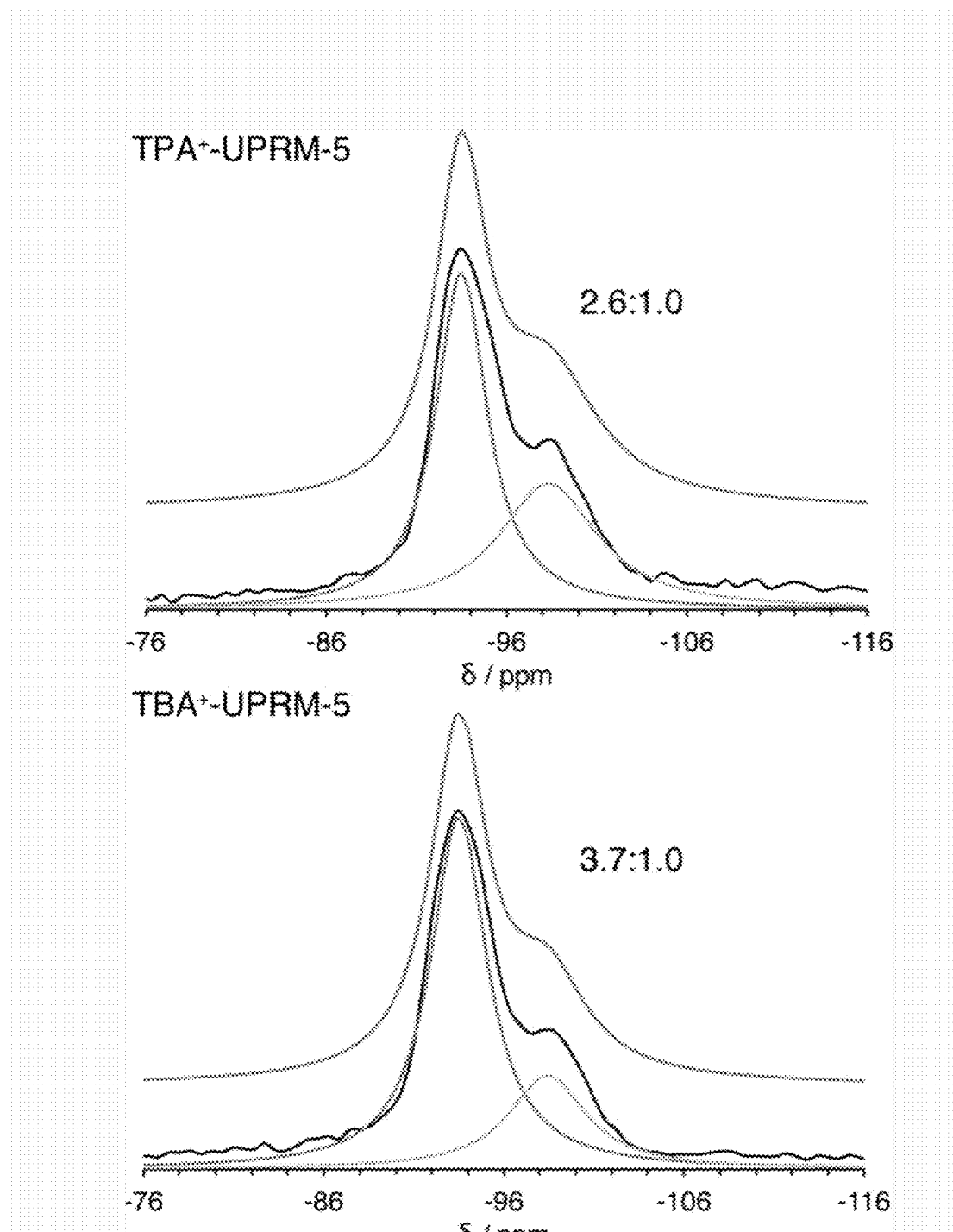
FIG. 3 shows $^{29}Si$ MAS-NMR spectra for as synthesized $TPA^+$- and $TBA^+$-UPRM-5, according to the present invention.
Figure 4:
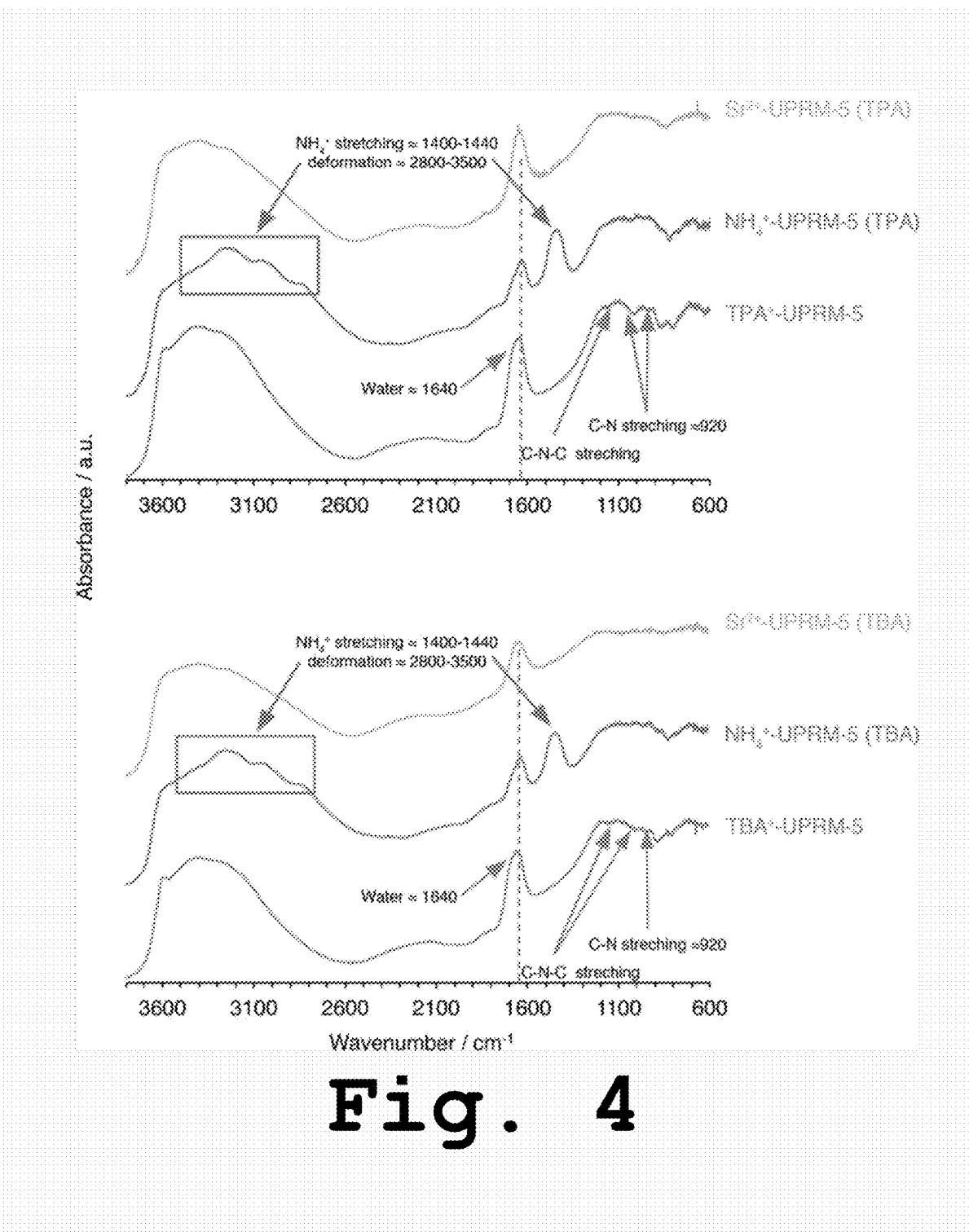
FIG. 4 shows FT-IR spectra for as-synthesized and ion-exchanged UPRM-5 materials, according to the present invention.

According to the NMR spectra shown in FIG. 3, each UPRM-5 variant exhibits two resonances (i.e., −93 and −97 ppm) and each could be related to silicon environments corresponding to $Si(2Si, 2Ti_{octa})$ and $Si(3Si, 1Ti_{semi-octa})$. After careful spectral deconvolution, the resulting peak intensities of the MAS-NMR resonances could be related to the concentration of the two different titanium coordination environments. In other words, the analysis would yield a ratio between the amounts of octahedrally coordinated titanium to the amount of semi-octahedrally coordinated titanium. For $TPA^+$- and $TBA^+$-UPRM-5 these ratios are 2.6 and 3.7, respectively, which may indicate that there is a higher amount of semi-octahedrally coordinated titanium in the samples prepared with $TPA^+$. Combining these results with those observed in FIGS. 1 and 2, one may assume that the $2\theta=12.6°$ peak maximum intensity corresponded to a lower level of random framework faulting. Similar findings have been reported for ETS-4 materials.

Material Detemplation and Strontium Incorporation: DRIFT and TGA.

The DRIFT technique was used to determine, in a qualitative fashion, the effectiveness of the ion exchange procedures both for the detemplation and effective functionalization of the material. The infrared spectra for both as-synthesized UPRM-5 variants displayed bands in the 1030-1060 and 666-672 $cm^{-1}$ regions and these were related to the skeletal $NC_4$ stretching characteristic of quaternary ammonium cations and revealing the presence of the SDAs. The bands positioned at ca. 920 and 1000 $cm^{-1}$ were related to the C—N stretching while the one located at ca. 1132 $cm^{-1}$ was related to the C—N—C antisymmetric stretching, corroborating yet again the presence of the SDAs. The $NH_4^+$ exchanged samples showed bands in the 1400-1440 $cm^{-1}$ and 2800-3500 $cm^{-1}$ regions that were related to the ingoing cation. However, bands related to the SDA where not appreciable. For the $Sr^{2+}$ ion-exchanged samples, none of the aforementioned spectral bands were present, confirming complete removal of the ammonium species. It should be mentioned that all of samples exhibited DRIFT bands in the 650-1400 cm$^{-1}$ region, but the intensity of these were much lower for the ion-exchanged variants. A similar result was obtained by Hernández-Maldonado and co-workers for a UPRM-5 materials prepared with TEA$^+$. These bands correspond to the stretching of the TO$_4$ tetrahedra and not the template.

Compositional data gathered from TGA results served as additional evidence for the effectiveness of the SDA removal procedure and further ion exchange as shown in Table 1.

TABLE 1

| Sample | SDA (wt.%) | Loosely Bound Water Content (wt.%) | Tenacious Water Content (wt.%) | Total Water Content (wt.%) |
|---|---|---|---|---|
| As synthesized TPA$^+$-UPRM-5 | 2 | 8 | 7 | 15 |
| As synthesized TBA$^+$-UPRM-5 | 4 | 5 | 8 | 13 |
| Sr$^{2+}$-UPRM-5 (TPA) | 0 | 13 | 6.5 | 19.5 |
| Sr$^{2+}$-UPRM-5 (TBA) | 0 | 15 | 4.5 | 19.5 |

After ion exchange for Sr$^{2+}$, both of the UPRM-5 variants contained no SDA moieties. Instead, the samples contained for more loosely bound water molecules, probably occupying the now detemplated pores. However, it is worth noting that the amount of structural or tenacious water remained almost the same in all of the samples (both as-synthesized and ion exchanged). Such type of water has been linked to hydroxyl groups coordinated to semi-octahedral titanium in ETS-4 materials.

In-Situ High Temperature XRD.

Figure 5:
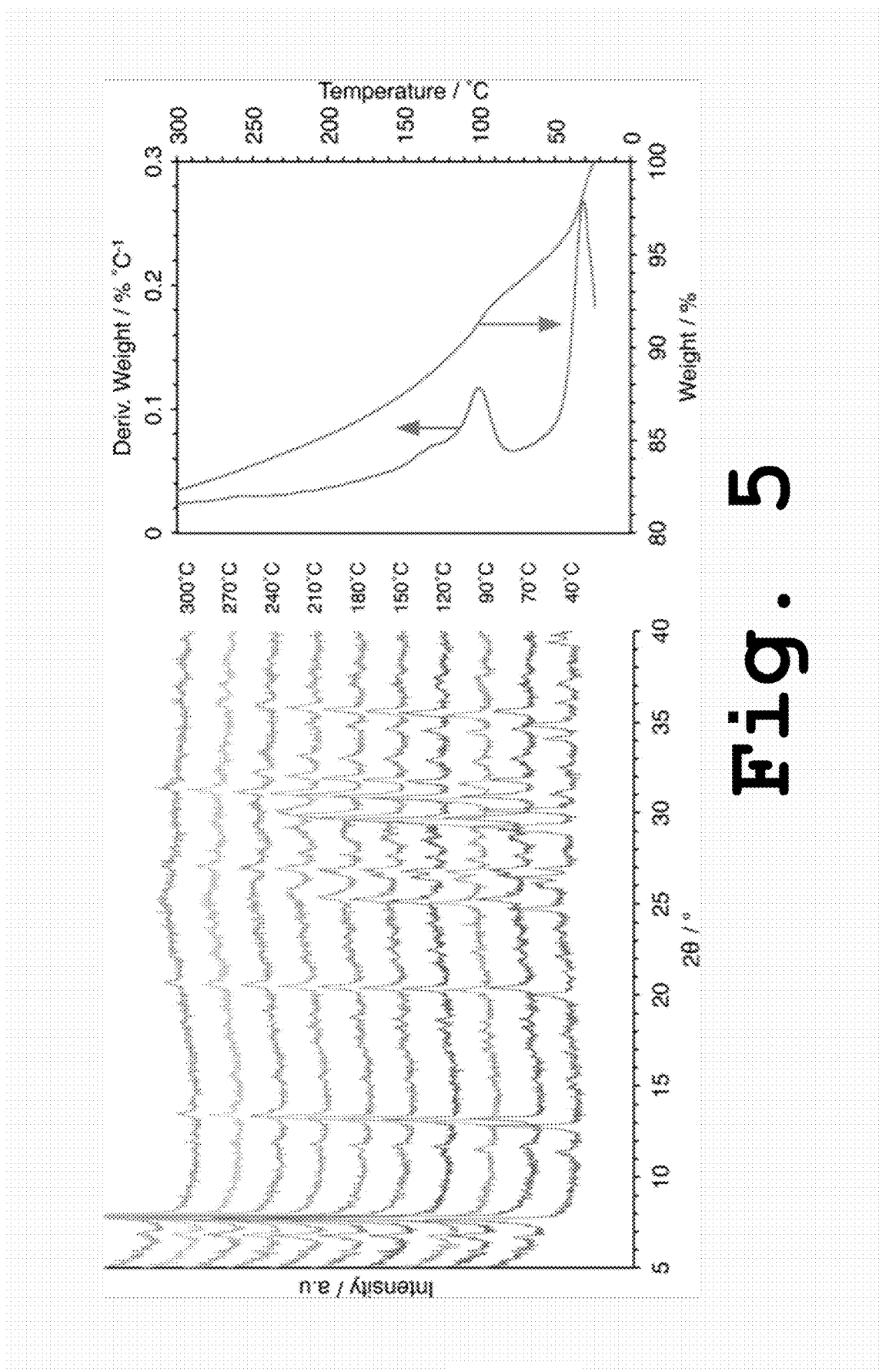
FIG. 5 shows in situ high temperature XRD patterns and TGA profiles of $Sr^{2+}$-UPRM-5 (TPA) gathered under dry helium atmosphere, according to the present invention.
Figure 6:
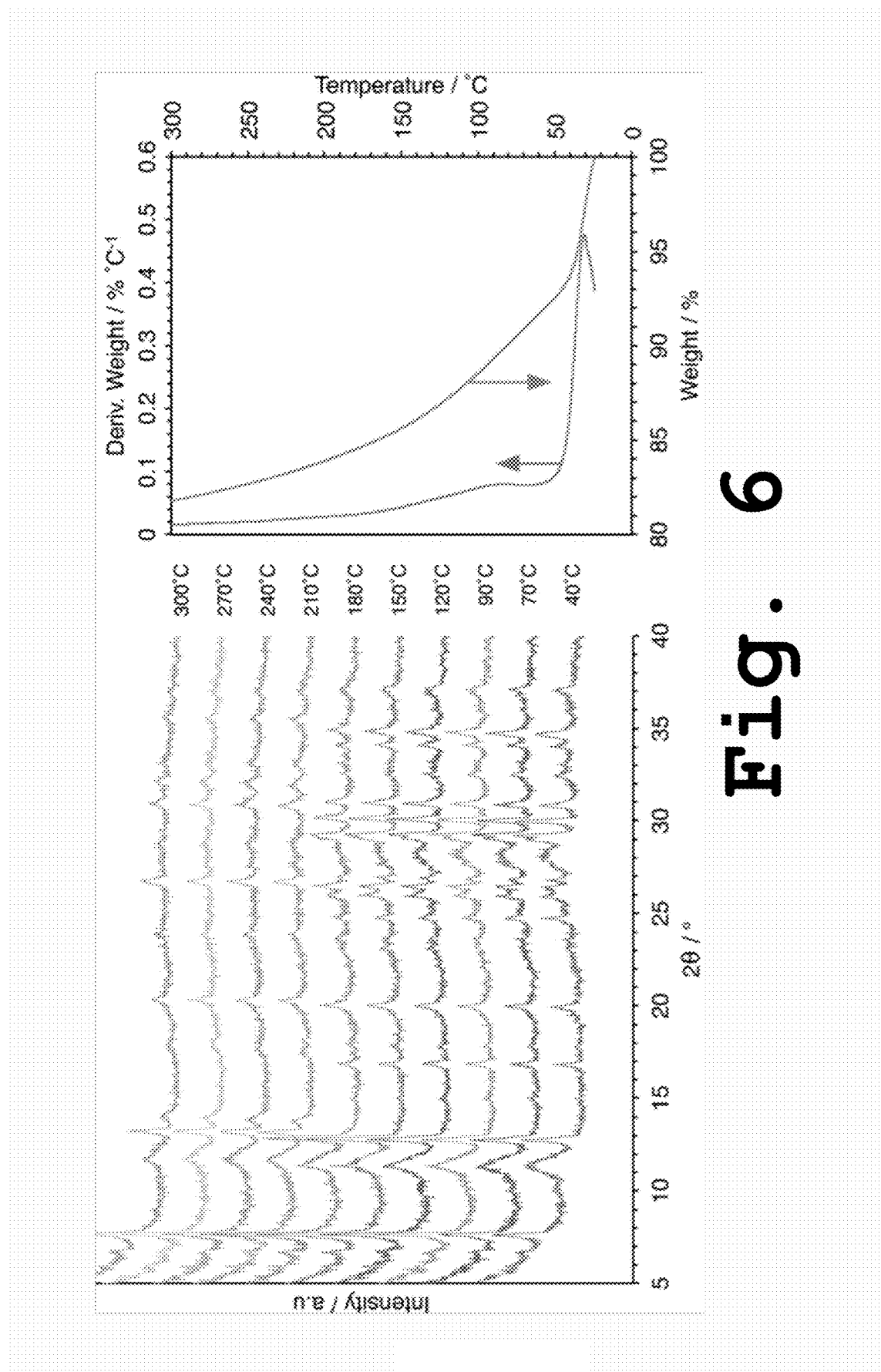
FIG. 6 shows in situ high temperature XRD patterns and TGA profiles of $Sr^{2+}$-UPRM-5 (TBA) gathered under dry helium atmosphere, according to the present invention.

The long-range order of the Sr$^{2+}$ ion exchanged UPRM-5 materials (i.e., Sr$^{2+}$-UPRM-5 (TPA) and Sr$^{2+}$-UPRM-5 (TBA)) frameworks was monitored during heat treatment in situ via XRD and the results are gathered in FIGS. 5 and 6. TGA profiles were also included in these figures to help in correlating any structural changes to the elimination of loosely and strongly bound water molecules. For Sr$^{2+}$-UPRM-5 (TPA), the in situ XRD patterns stack (FIG. 5) showed several peaks shifting to higher diffraction angles (or lower d-spacing) after 90° C. Peak shifting was more significant in planes corresponding to ca. 2θ=7.6, 12.7 and 20.0°. A similar observation can be made for the case of Sr$^{2+}$-UPRM-5 (TBA), with peaks displacement starting at temperatures higher than 120° C. The aforementioned peaks could be associated to the materials pore system, in which faulting would be introduced by semi-octahedral titanium. Since stabilizing water molecules are directly correlated to these semi-octahedral species, the observed peak shifts could be associated to the release of these tenacious water molecules and due to cation relocation. In the case of Sr$^{2+}$-UPRM-5 (TBA), the structural changes due to the release of tenacious water became more evident at 210° C. where a new peak appears at around 2θ=13.8°. For ETS-4 materials, the position corresponding to this peak has been considered to be very sensitive to the dehydration process and apparently this is also the case for Sr$^{2+}$-UPRM-5 (TBA). However, this reflection appears to fade off at higher temperatures probably as a result of pore distortion or blocking due to the framework contraction. Significant changes at higher temperatures and the resulting partial destruction of the structure in both UPRM-5 variants are also evident in FIGS. 5 and 6. The latter could be a result of the collapsing of the semi-octahedral titanium centers. However, it is quite clear that the UPRM-5 variant that results from using TBA$^+$ as the SDA posses a much higher thermal stability when compared to the one prepared with TPA$^+$. This finding matches well with the MAS NMR data discussed above, which indicates that the variant prepared with TBA+ contained less semi-octahedral titanium centers and, therefore, probable less structural faulting.

Figure 7:
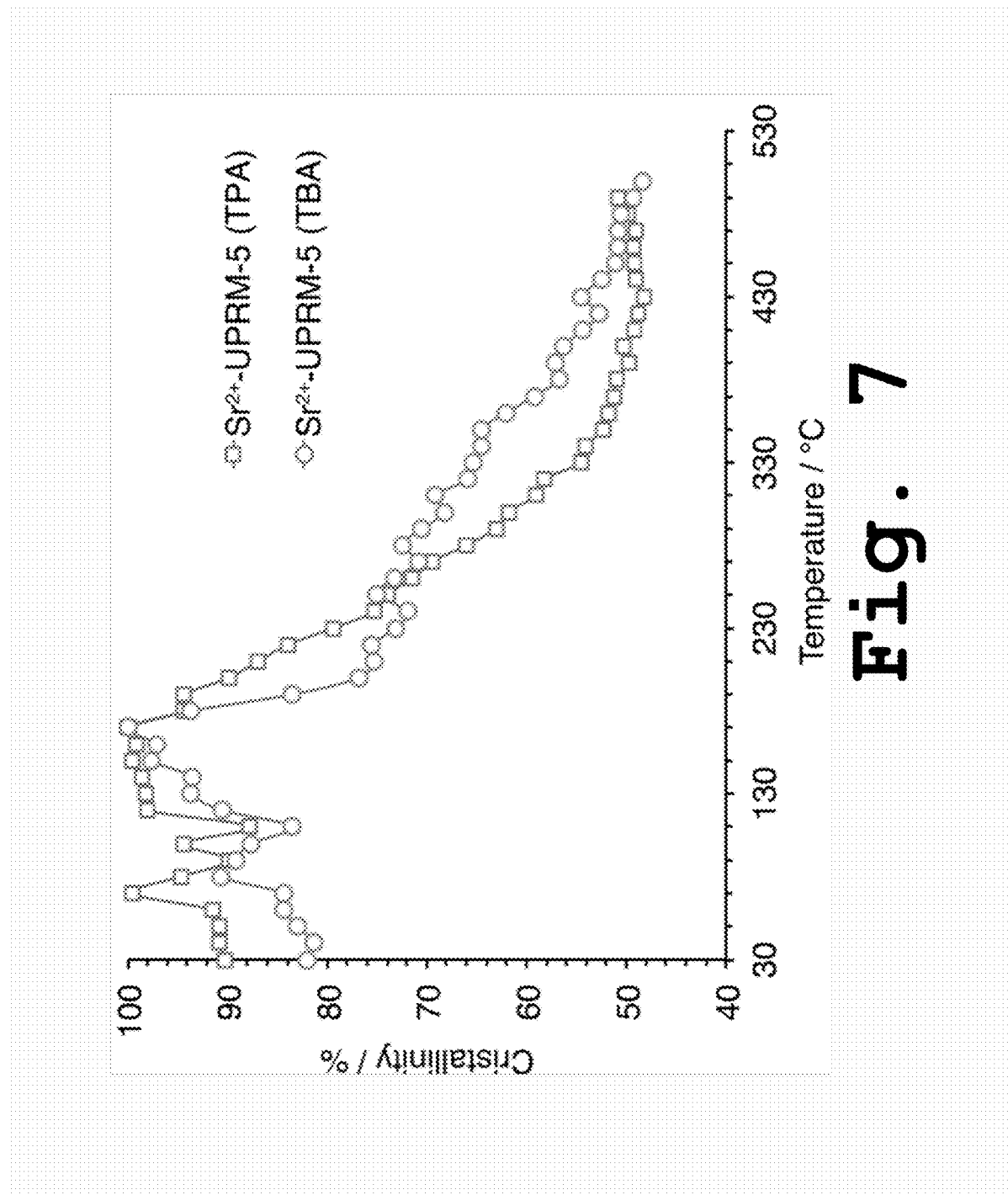
FIG. 7 shows crystallinity profiles of $Sr^{2+}$-UPRM-5 (TPA) and $Sr^{2+}$-UPRM-5 (TBA) samples during thermal treatment, according to the present invention.

Profiles of apparent crystallinity versus temperature were calculated based on the data obtained from the in situ XRD tests and these are gathered in FIG. 7. Both of the Sr$^{2+}$-UPRM-5 variants apparently achieved the highest crystallinity at 170° C. At temperatures higher than 350° C. the crystallinity is reduced to almost 50% but remained constant. Partial conservation of the framework at these temperatures could be attributed to octahedral titanium centers remaining intact.

Surface Area Measurements.

Figure 8:
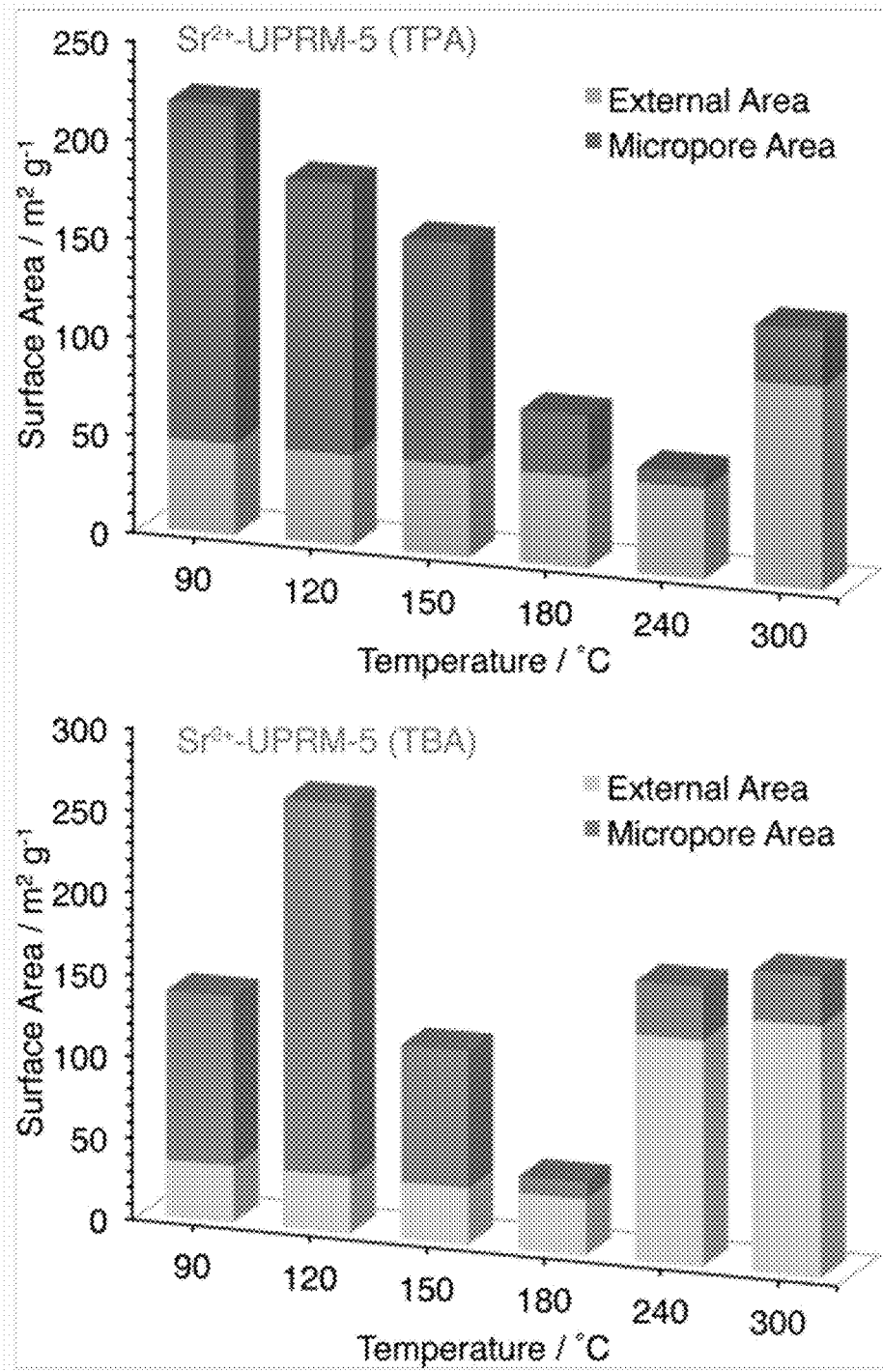
FIG. 8 shows surface area distribution for $Sr^{2+}$-UPRM-5 (TPA) and $Sr^{2+}$-UPRM-5 (TBA) samples activated at different temperatures, according to the present invention.

Different from ETS-4, UPRM-5 materials are able to maintain framework flexibility upon dehydration while sustaining larger adsorption capacities. This is reflected, for instance, in some of the textural properties of the UPRM-5 variants. Hernández and co-workers have shown that strontium(II) exchanged UPRM-5 materials originally prepared with TEA$^+$ acting as a SDA has a surface area of 288 m$^2$ g$^{-1}$ after an activation or degassing temperature of 90° C. and vacuum are employed. In the present invention, Sr$^{2+}$-UPRM-5 (TPA) and Sr$^{2+}$-UPRM-5 (TBA) showcased a maximum surface area of 217 and 261 m$^2$ g$^{-1}$, respectively, after employing optimal activation temperatures as shown in FIG. 8. Since these area values contain contributions from the particles external and microporous features that are coupled, it was necessary to further analyze the N$_2$ adsorption isotherms (−196° C.) and quantify the effect of the thermal treatment on the external surface and pore individually (i.e., decoupling). This was accomplished via a t-plot analysis method and the results are shown also in FIG. 8.

Figure 9:
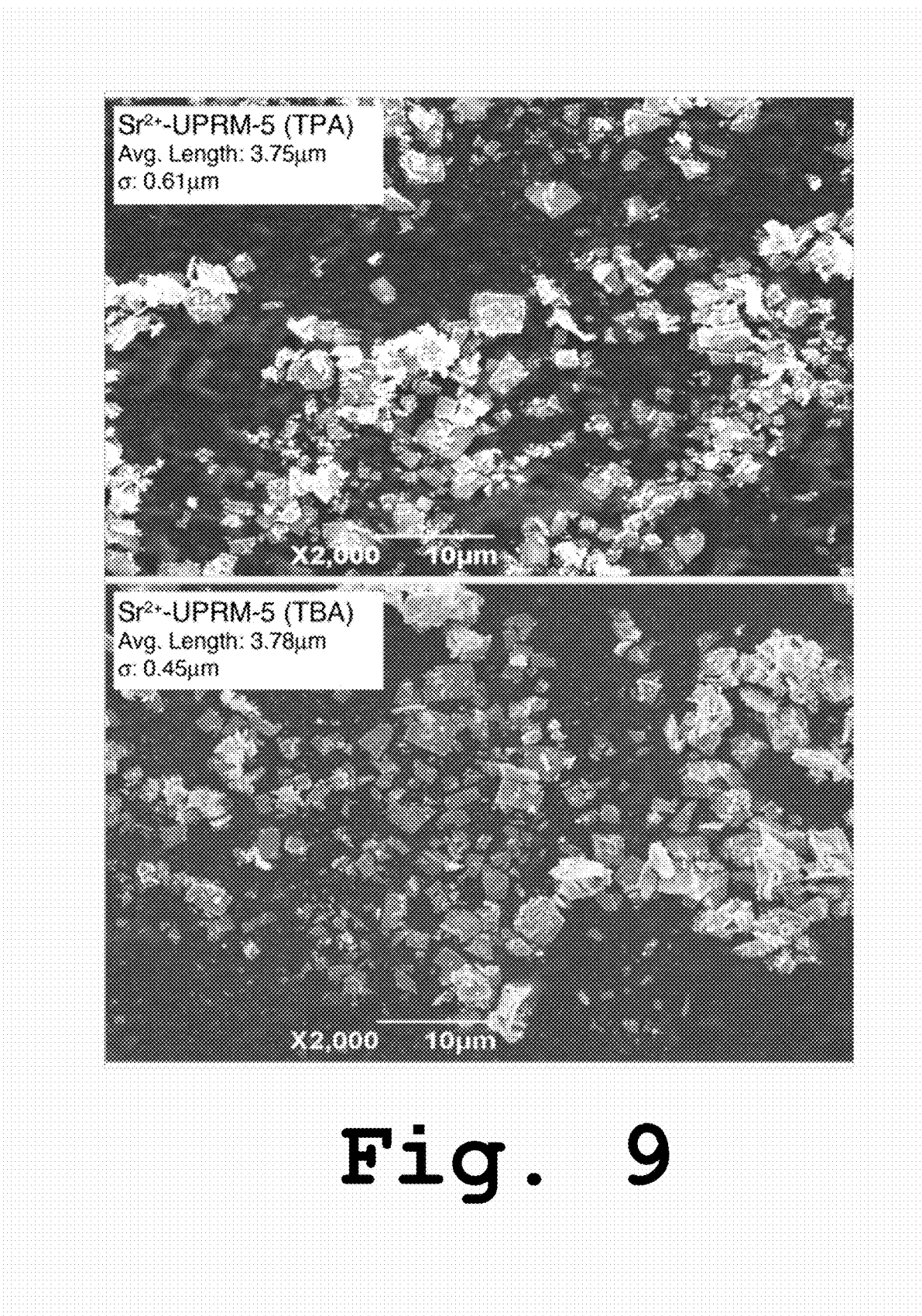
FIG. 9 shows SEM micrographs of $Sr^{2+}$-UPRM-5 (TPA) and $Sr^{2+}$-UPRM-5 (TBA) samples treated at 300° C., according to the present invention.

Upon thermal treatment in vacuum, the Sr$^{2+}$-UPRM-5 (TPA) material external surface area remained nearly constant up to a temperature of ca. 240° C. (FIG. 8). This translates to pore shrinkage or distortion upon thermal treatment. Upon reaching a temperature of around 300° C. the external surface area increases considerably, indicating destruction of the structure and matching the results obtained from the in situ high temperature XRD analyses (FIG. 5). In the case of Sr$^{2+}$-UPRM-5 (TBA), the external surface area increases at a much lower activation temperature when compared to the UPRM-5 variant prepared with TPA$^+$. In fact, SEM micrographs (FIG. 9) obtained for samples treated at the aforementioned temperature showed particle macro scale fractures, which could explain the sudden increase in external surface area. Careful measurements of the characteristic length of the slab-shaped crystals activated at 90° C. and 120° C. for Sr$^{2+}$-UPRM-5 (TPA) and Sr$^{2+}$-UPRM-5 (TBA), respectively, and the length of the same crystals at an activation of 300° C. exhibited a reduction of the average crystal size by up to 44% for the samples prepared with TPA$^+$ and 35% for the ones prepared with TBA$^+$.

It is important to note that the maximum micropore surface area observed for Sr$^{2+}$-UPRM-5 (TPA), 172 m$^2$ g$^{-1}$, was obtained at a temperature at 90° C., while for Sr$^{2+}$-UPRM-5 (TBA) the maximum (206 m$^2$ g$^{-1}$) was observed at 120° C. These temperatures may correspond to the point for which the mobile water, the water that resides inside the pores, is completely released and to the start of the release of the structural water. As stated previously, for flexible titanosilicates such as ETS-4, the structural or tenacious water appears to be coordinated to the OH groups of the apical oxygen in the semi-octahedral Ti. The release of such water induces the movement of the semi-octahedral units and this should result in structure contraction.

Pure Component Carbon Dioxide Adsorption.

Analyses done for pure carbon dioxide adsorption at 25° C. onto strontium(II) exchanged UPRM-5 variants activated or degassed at different temperatures (FIG. 10) indicated a trend similar to the one observed for the surface areas (i.e., nitrogen adsorption). This was expected since carbon dioxide molecules have a kinetic diameter that is only slightly smaller than that of nitrogen (i.e., 3.30 vs. 3.65 Å). Maximum carbon dioxide adsorption capacities recorded at 7 atm were ca. 2.80 mmol g$^{-1}$ (or 11 wt. %) for $Sr^{2+}$-UPRM-5 (TPA) and $Sr^{2+}$-UPRM-5 (TBA) and this took place after the samples were activated at 90 and 120° C., respectively. At higher activation temperatures, the carbon dioxide adsorption at high pressure decreased considerably, suggesting that the pore volume decreased upon contraction of the framework. At 300° C., however, the adsorption behavior observed in the two UPRM-5 materials is quite different in comparison. In the case of $Sr^{2+}$-UPRM-5 (TPA), the adsorption amount at any given pressure decreased by nearly 65%, most likely a result of a severe structural damage to the pore channels during the thermal treatment. For $Sr^{2+}$-UPRM-5 (TBA) the adsorption capacity was reduced only by 32% and could be attributed to a more ordered structure upon thermal treatment (FIG. 6).

A comparison of the $CO_2$ data gathered for $Sr^{2+}$-UPRM-5 (TBA) activated at 180° C. with the one gathered $Sr^{2+}$-UPRM-5 (TEA) variant activated at the same temperature (data reported elsewhere) clearly showcases the improvements made to the UPRM-5 structure by employing a larger SDA. For instance, at 0.1 atm, the $TBA^+$ variant adsorbed about 0.82 mmol/g whereas the $TEA^+$ variant adsorbed only 0.4 mmol/g at the same pressure. This corresponds to a 50% increase in $CO_2$ uptake. Since the UPRM-5 variant prepared with $TEA^+$ collapses after 180° C., the results clearly suggest that the variants synthesized with $TBA^+$ and $TPA^+$ had a higher thermal stability that the ones previously reported. Higher thermal stability has been attributed in the case of ETS-4 and ETS-10 to a larger amount of octahedral titanium centers, which matches well with the observations made here.

Figure 10:
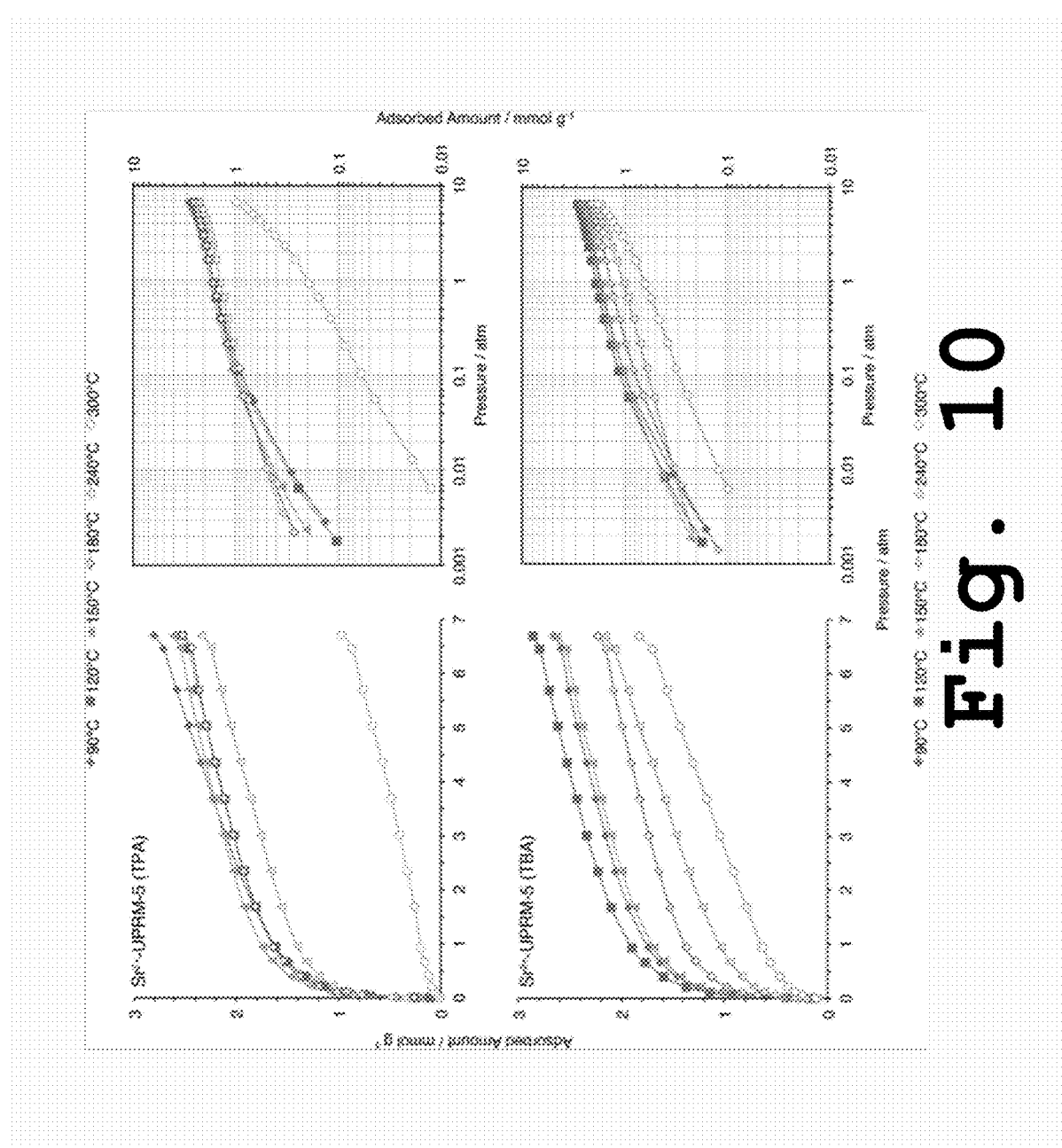
FIG. 10 shows adsorption isotherms for carbon dioxide on for $Sr^{2+}$-UPRM-5 (TPA) and $Sr^{2+}$-UPRM-5 (TBA) samples at 25° C., adsorbents activated at different temperatures, according to the present invention.

At low pressure, the observed carbon dioxide adsorption amounts followed patterns that reflect the level of interaction between the adsorbate and the adsorbent surface. At higher temperatures, the $Sr^{2+}$-UPRM-5 (TPA) structural contraction process apparently results in a pore systematic collapsing process. The uptake amounts observed in the low-pressure region (<0.01 atm) increased when the adsorbent activation or degassing temperature was increased up to ca. 240° C. This could be due to the result of overlapping of the interaction potential of the adjacent pore walls, a phenomenon that has been well documented in the literature. Since the strontium cations are most likely the preferred carbon dioxide adsorption sites and these would not undergo any hydrolysis, it is possible to assume that water elimination (strongly bound) did not play any role in the low-pressure adsorption process. For the case of the $Sr^{2+}$-UPRM-5 (TBA) variant, it appears that its higher thermal stability diminish any surface overlapping effect since the carbon uptake loadings differed considerably only at high pressure (FIG. 10). These results suggest that $Sr^{2+}$-UPRM-5 (TPA) materials could be tailored for purification applications (i.e., deep removal of carbon dioxide) whereas $Sr^{2+}$-UPRM-5 (TBA) materials could be tailored for bulk-level separation applications.

Isosteric Heats of Adsorption and Apparent Adsorption Mechanism.

Figure 11:
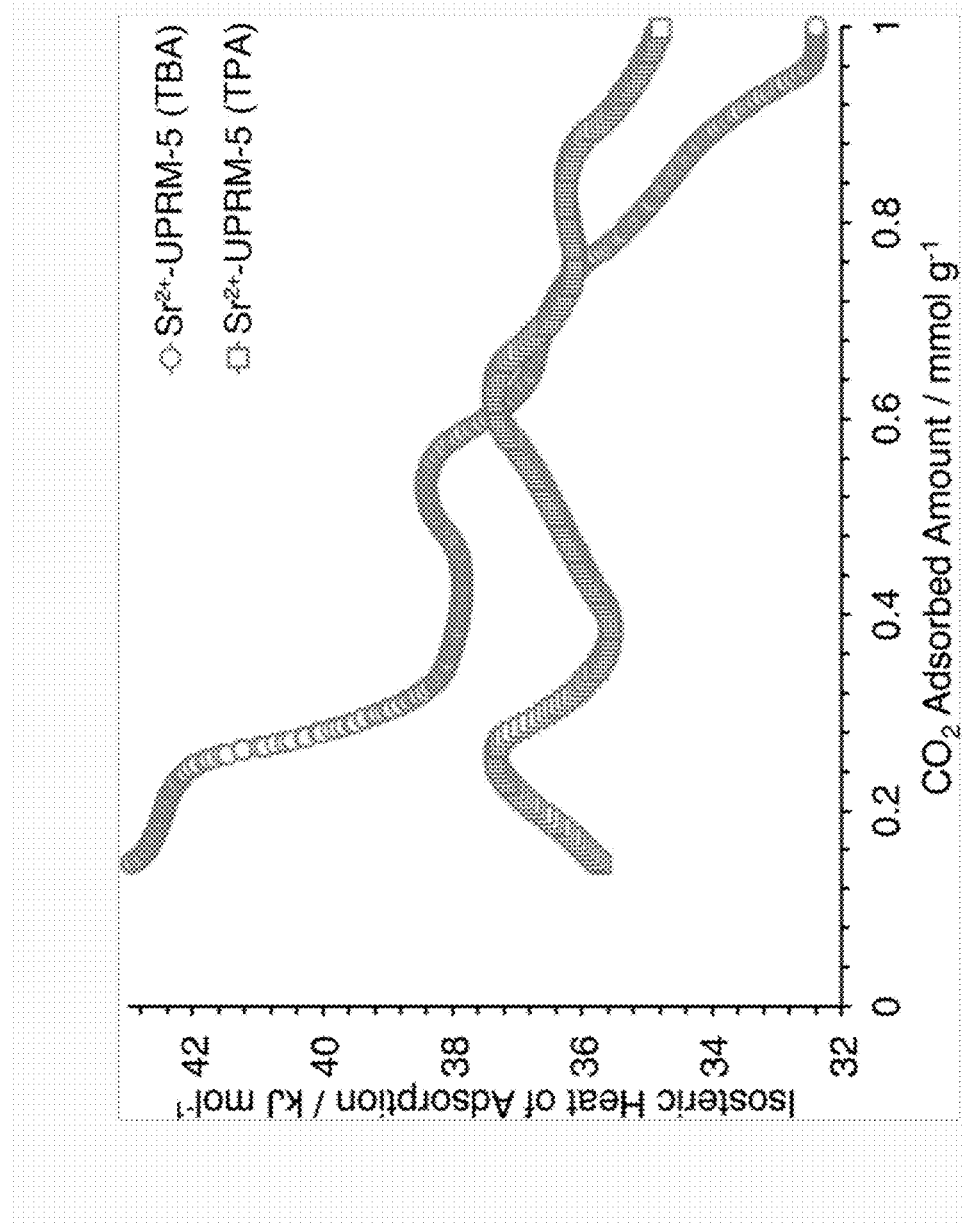
FIG. 11 shows isosteric heats of adsorption of carbon dioxide on for $Sr^{2+}$-UPRM-5 (TPA) and $Sr^{2+}$-UPRM-5

Heats of adsorption were estimated for carbon dioxide uptake onto $Sr^{2+}$-UPRM-5 (TPA) and $Sr^{2+}$-UPRM-5 (TBA) materials activated at 90 and 120° C., respectively. The resulting profiles are shown in FIG. 11. Both UPRM-5 variants showed sorbent-sorbate interactions in the physisorption range with maxima of 37 and 43 kJ mol$^{-1}$ for $Sr^{2+}$-UPRM-5 (TPA) and $Sr^{2+}$-UPRM-5 (TBA), respectively. In addition, the isosteric heat profiles resemble those typical of heterogeneous surfaces, which correlated well with the surface heterogeneity parameters obtained after fitting the L-F and D-A isotherms models as shown in FIG. 13.

For the L-F model, a $n_{L-F}$ value greater than 1 translates to a surface is not homogeneous or Langmuirian. In the case of the D-A model, a $n_{D-A}$ value smaller than 3 is associated to an heterogeneous surface. However, it is important to keep in mind that among models tested here, only the D-A one takes into consideration the interaction between the adsorbate volume (instead of a monolayer) and the adsorbent surface. This is the typical scenario found in microporous materials. Furthermore, the D-A model parameter C data obtained for each adsorbent variant (FIG. 13) matched well with the overall trend observed in FIG. 11. That is, a slightly stronger average interaction between carbon dioxide and the $Sr^{2+}$-UPRM-5 (TBA) materials when compared to that of the other adsorbent variant.

The differences seen in the profiles shown in FIG. 11 were probably due to unique cation positions within the structure and/or different cation loadings. In order to elucidate this, however, it was important to estimate the unit cell composition for each variant. A full elemental analysis was achieved by means of ICP, TGA and MAS-NMR data. The NMR data was employed to fix the relative amount of octahedrally and semi-octahedrally coordinated titanium during the elemental analysis calculations (i.e., amount of OH groups). According to the unit cell composition for $Sr^{2+}$-UPRM-5 (TPA) and $Sr^{2+}$-UPRM-5 (TBA) (Table 2), there is nearly one additional $Sr^{2+}$ cation per unit cell of the former material compared to that of the latter. This could be attributed to significant differences in local coordination environments between the two materials. In addition, both unit cells contain sodium cations that were probably located in sites forbidden to strontium for exchanged. Interestingly, the Si/Ti ratio in both unit cells is nearly identical, but smaller in comparison to what has been reported previously for UPRM-5 and ETS-4. The Si/Ti ratio obtained for these new UPRM-5 variants could be probably related to less structural faulting.

TABLE 2

| Sample | Unit Cell |
|---|---|
| $Sr^{2+}$-UPRM-5 (TPA) | $|Sr_{3.0}^{2+}Na_{3.3}^+OH_{2.3}^-|[Si_{11.4}Ti_{8.3}O_{37}]$:23 $H_2O$ |
| $Sr^{2+}$-UPRM-5 (TBA) | $|Sr_{2.4}^{2+}Na_{3.9}^+OH_{1.5}^-|[Si_{9.3}Ti_{7.1}O_{3.7}]$:20 $H_2O$ |

Given the unit cell data (Table 2), it is evident that the average adsorbate-adsorbent interaction potential (FIG. 11) is due accessibility of carbon dioxide to $Sr^{2+}$ cations rather than the amount of these. Furthermore, since sodium cations relocate themselves across zeolitic frameworks upon dehydration, some of these may now be located in positions accessible to carbon dioxide. Interaction between the adsorbate and the cation depends on the nature of the latter, among other things, and this should result in an overall heterogeneous surface potential. Hernandez-Maldonado and co-workers have shown that for the adsorption of carbon dioxide onto microporous silicoaluminophosphate materials, the adsorbate undergoes stronger interactions with strontium as compared to sodium cations. Assuming that the same applies to the UPRM-5 adsorbents, the adsorbed amounts of carbon dioxide corresponding to the first inflection points observed in the isosteric heat of adsorption profiles (FIG. 11) should correspond to occupancy of all of the available strontium sites. Using unit cell data corrected for the amount tenacious water remaining after degassing, the aforementioned heat of adsorption profile heat of adsorption profile inflection points should translate to about 0.46 and 0.37 carbon dioxide molecules per unit cell for $Sr^{2+}$-UPRM-5 (TPA) and $Sr^{2+}$-UPRM-5 (TBA), respectively. Since the observed adsorption energy is larger in the latter adsorbent, it is plausible to state that the strontium(II) environment in that sample is more favorable for interaction with carbon dioxide. This could be attributed to the level of faulting and the corresponding locations, in which cations have to position themselves in order to compensate for all the charge deficiencies in the titanium silicate framework.

Pure Component Adsorption Isotherms for Carbon Dioxide, Methane and Nitrogen.

Adsorption data at 25° C. for different gases in the strontium-based adsorbents were gathered after employing optimal activation or degassing temperatures (i.e., those resulting in overall larger carbon dioxide loadings). These were 90 and 120° C. for $Sr^{2+}$-UPRM-5 (TPA) and $Sr^{2+}$-UPRM-5 (TBA), respectively. According to the results shown in FIG. 12 both adsorbents displayed remarkable selectivity towards carbon dioxide. This is mainly due to an enhanced interaction between the large carbon dioxide quadrupole moment and the electric field generated by the extraframework divalent cations. Since the quadrupole moment of carbon dioxide is about three times larger than that of nitrogen and methane does not have any quadrupole moment, this will result in an enhanced surface electrostatic potential. However, both adsorbent materials also displayed better selectivity toward methane over nitrogen. This could be attributed to the methane octopole moment that appears when it is in contact with the electric field cation electric field.

FIG. 12 also shows greater uptake of carbon dioxide in the $Sr^{2+}$-UPRM-5 (TBA) adsorbent when compared to the other variant. This is directly related to the data shown in FIG. 11 and should be a result of favorable surface and textural properties brought by the use of $TBA^+$ as an SDA during the synthesis of UPRM-5.

Finally, both of the UPRM-5 variants of the present invention exhibited superior adsorption capacities when compared to other porous titanosilicates. At atmospheric conditions, $Sr^{2+}$-UPRM-5 (TBA) materials adsorbed at least 40% more $CO_2$ when compared to barium or copper exchanged ETS-4. A similar result was found when compared to materials that are analog to ETS-4, namely the RPZ (reduced pore size) titanium silicate series. Both UPRM-5 variants also showcased larger single point selectivity values ($CO_2/CH_4$ @ 1 atm) when compared to the aforementioned titanosilicate materials, with the exception of $Ba^{2+}$-RPZ. However, the maximum $CO_2$ swing capacity for the later was ca. 0.4 mmol per gram of adsorbent, which is at least three times smaller when compared to the capacities exhibited by both $Sr^{2+}$-UPRM-5 variants.

CONCLUSIONS

Two new UPRM-5 variants have been obtained by employing microwave assisted heating and $TPA^+$ or $TBA^+$. According to XRD and MAS NMR data, the $NR_4^+$ species apparently act as SDAs during the synthesis of the porous frameworks. In particular, each quaternary ammonium cation produced structures with unique level of faults as evidenced by the titanium coordination environments. Furthermore, upon detemplation and ion exchange with strontium(II) each UPRM-5 variant displayed higher thermal stability ranges when compared to other titanium silicates. This was verified via in situ high temperature XRD and surface area measurements at temperatures up to and greater than 300° C. In summary, UPRM-5 can be modified considerably at a structural and textural level by the use of larger alkyl ammonium based SDAs. This controls and enhances its thermal stability and ensures a superior selectivity toward carbon dioxide. The former is critical for applications that rely on thermal swing operations, were framework stability is imperative. It also shows the potential of modified titanium silicates as a feasible and economical option for several applications such as natural gas purification. More specifically, the results suggest that $Sr^{2+}$-UPRM-5 (TPA) materials could be tailored for applications in which deep removal of carbon dioxide is needed whereas $Sr^{2+}$-UPRM-5 (TBA) materials could be tailored for bulk-level separation applications.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method of synthesizing a titanosilicate material comprising:
    adding a structure directing agent selected from the group consisting of: tetrapropylammonium ($TPA^+$) and tetrabutylammonium ($TBA^+$), that allows the formation of a porous adsorbent material, to a gel solution containing titanium (III) chloride solution in HCl and stirring for 30 minutes to prepare a gel mixture and crystallizing said gel mixture to form a titanosilicate porous material having structural faults introduced by said structure directing agent;
    removing said structure directing agent from said titanosilicate porous material via ion exchange with $NH_4^+$ to form a detemplated material; and
    functionalizing said detemplated material with strontium cation via ion exchange to form a titanosilicate porous material having a micropore area that varies as a function of thermal activation temperature due to said structural faults introduced by the structure directing agent, wherein the titanosilicate material having an unit cell selected from the group consisting of $|Sr^{2+}_{3.0} Na^+_{3.3} OH^-_{2.31}|[Si_{11.4}Ti_{8.3}O_{37}]:23H_2O$ and $|Sr^{2+}_{2.4} Na^+_{3.9} OH^-_{1.5}|[Si_{9.3}Ti_{7.1}O_{37}]:20H_2O$.

2. The method of claim 1, wherein said gel mixture comprises a composition having a formula of $3.4(TBA)_2O: 7.3Na_2O:1.2\ K_2O: 1.3TiO_2: 10SiO_2: 201.5H_2O$.

3. The method of claim 1, wherein said gel mixture comprises a composition having a formula of $3.4(TPA)_2O: 7.3Na_2O:1.2\ K_2O: 1.3TiO_2: 10SiO_2: 201.5H_2O$.

4. The method of claim 1, wherein said functionalized detemplated material exhibits selectivity for $CO_2$.

* * * * *